Figure 1:
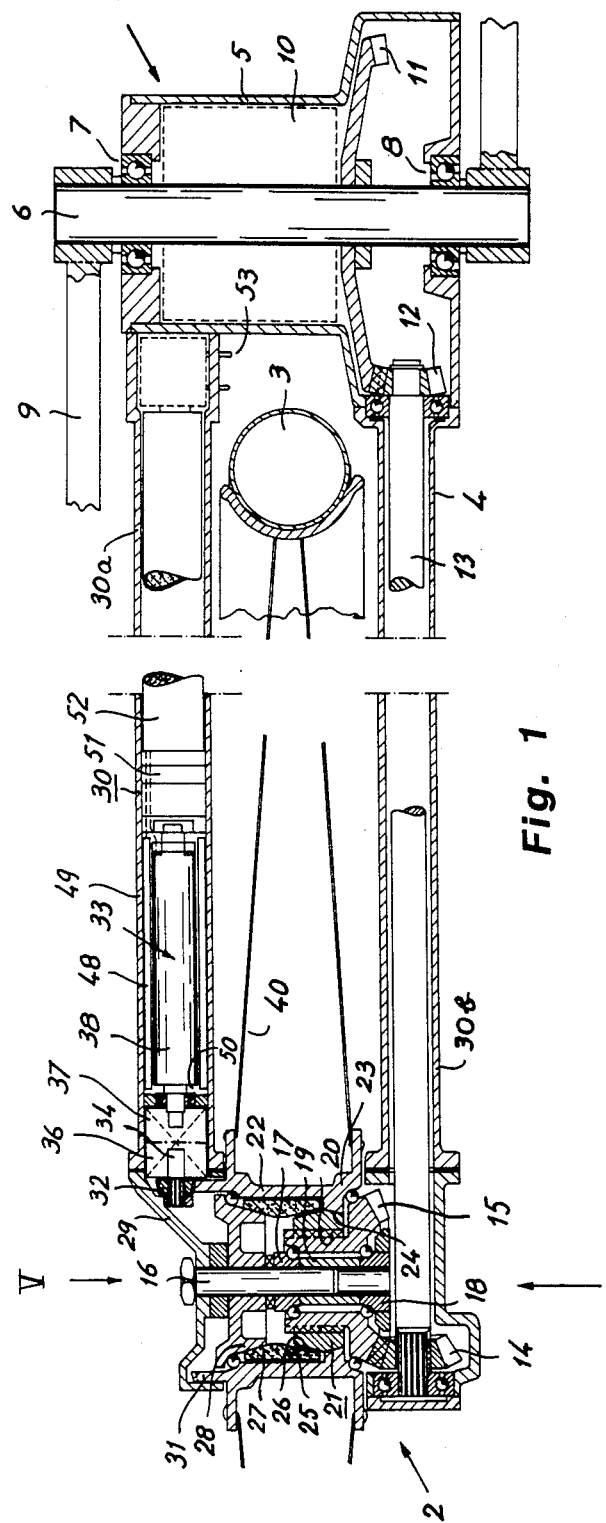

United States Patent [19]

Enocson

[11] Patent Number: 4,613,010

[45] Date of Patent: Sep. 23, 1986

[54] POWER TRANSMISSION SYSTEM FOR A BICYCLE

[76] Inventor: Ake Enocson, Moheda S-340 60, Sweden

[21] Appl. No.: 689,046

[22] PCT Filed: Apr. 12, 1984

[86] PCT No.: PCT/SE84/00117

§ 371 Date: Dec. 4, 1984

§ 102(e) Date: Dec. 4, 1984

[87] PCT Pub. No.: WO84/04076

PCT Pub. Date: Oct. 25, 1984

[30] Foreign Application Priority Data

Apr. 12, 1983 [SE] Sweden ............................ 8302022

[51] Int. Cl.$^4$ ............................................. B62M 1/06
[52] U.S. Cl. .................................... 280/260; 192/6 R; 362/192
[58] Field of Search ................. 280/260, 215, 212; 180/205, 206, 207, 65.2; 362/192, 193; 192/6 R

[56] References Cited

U.S. PATENT DOCUMENTS

| | | | |
|---|---|---|---|
| 598,863 | 2/1898 | Evans et al. | 280/260 |
| 2,378,634 | 6/1945 | Hussey | 280/260 |
| 2,452,660 | 11/1948 | Hussey | 192/6 R |
| 2,475,654 | 7/1949 | Watson | 280/260 |
| 3,152,674 | 10/1964 | Witte et al. | 192/6 R |
| 3,254,744 | 6/1966 | Kimpflinger et al. | 192/6 R |
| 3,861,715 | 1/1975 | Mendoza | 280/260 |
| 3,921,741 | 11/1975 | Garfinkle et al. | 180/205 |

FOREIGN PATENT DOCUMENTS

| | | | |
|---|---|---|---|
| 822347 | 11/1951 | Fed. Rep. of Germany | 280/260 |
| 894059 | 9/1953 | Fed. Rep. of Germany | 362/192 |
| 2276980 | 1/1976 | France | 362/193 |
| 114166 | 6/1945 | Sweden | |

Primary Examiner—John A. Pekar
Attorney, Agent, or Firm—McCormick, Paulding & Huber

[57] ABSTRACT

A power supply and transmission system for a bicycle of the type having a frame and a crank housing for a crank-and-pedal and from said crank housing a projecting fork carrying the drive wheel over the drive hub at the other end thereof, and in which the power transmission system comprises a drive shaft which at both ends is connected to angle gears at the crank housing and the drive hub and in which the drive shaft is enclosed in one of the fork tubes, and the power supply is directly connected to the power transmission system at the drive wheel hub. Preferably the crank housing is formed with a several stage gear. The drive wheel hub is formed as a free wheel hub which when pedaling the bicycle forwardly provides a power transmission between the drive shaft and the outer sleeve of the hub. The means for driving and braking the bicycle is a threaded power receiving gear which cooperates with a threaded double conical drive sleeve, which upon movement in one direction connects the power receiving gear to the outer sleeve of the hub, while when moved in the opposite direction connects the outer sleeve of the hub to a stationary mounted brake cone. In a preferred embodiment of the invention the electric power supply and transmission system is mounted in the second one of the two bottom fork tubes, and said electrical transmission system may include a centrifugal clutch for connecting an electric generator at a driving speed exceeding a predetermined value.

8 Claims, 6 Drawing Figures

U.S. Patent  Sep. 23, 1986  Sheet 1 of 4  4,613,010

POWER TRANSMISSION SYSTEM FOR A BICYCLE

The present invention generally relates to an improved power transmission system, and more particularly the invention relates to a mechanical, electric power supply and transmission system for a bicycle of a type having a frame with a crank housing for a crank-and -pedal means and from said crank housing a projecting bottom fork carrying the drive wheel over a drive hub at the outer end thereof and having a mechanical power transmission means between said crank housing and drive hub.

Previously known power transmission systems for a bicycle made use of chains, which from a chain wheel at the crank means drives a chain sprocket which is directly connected to the drive wheel hub. Driving by means of chains involves problems in that the chain is subjected to wear whereby it grows longer and the chain wheel teeth, especially the chain sprocket teeth at the wheel hub, are worn so that said teeth no longer fit exactly to the chain. When using chain drives there is always a risk that the chain runs off the chain wheel or sprocket and either makes it impossible to brake the bicycle or tangels itself so that the bicycle is abruptly braked. There is also a risk that the chain will break. In open chain drive systems there is also a risk that parts of the cloths of the bicycle rider get caught between the chain and the chain wheel teeth.

In known drive systems for a bicycle having exchange gears substantial problems also may appear. The exchange gears may be of the several sprocket type in which an elongated and spring loaded chain is used in which the chain may be moved between different large sprockets alternatively the gear may be of the hub type, whereby the gear is housed in the wheel hub. As mentioned above a gear of the chain sprocket type needs an elongated and spring loaded chain which easily may jump off the sprocket or the chain wheel, while changing gears by moving the chain from one sprocket to the next sprocket both the chain and the sprocket may be damaged.

In gears of the hub type the exchange cog wheels must for practical reasons be made rather weak in order to be housed in the hub, and weak cog wheels may easily be damaged, especially in case of careless handling or changing of gears.

In order to overcome the above mentioned problems, U.S. Pat. No. 3,861,715 proposes the power transmission as a solid shaft extending between the crank-and-pedal means and the the drive wheel hub and the drive wheel hub as a free wheel mechanism. A drive connection is provided when the crank is moved forwardly and the hub idles when the crank is not moved. For braking it is necessary to make use of separate brakes of previously known types, for instance a separate brake engaging the wheel rim. Such brakes are apt to frequent failure and are not considered traffic safe.

Most previously known bicycles have a separate electric system including a dynamo which is releasably mounted at the front wheel fork or at the seat stays or the bottom forks at the rear wheel. Irespective of the location of the said separate dynamo such dynamos have a rather low effect, they generally are rather power. In case of rain and especially snow the power intake, which is in contact with the bicycle tire skides, the dynamo is subjected to dampness and moisture and above all there is a risk that the dynamo becomes loose from the cycle frame and comes into contact with the wheel spokes as may cause serious accidents.

The object of the invention therefore is to solve the problem of providing an improved power transmission system for a bicycle in which the above mentioned problem involved in chains and chain sprockets have been eliminated, which drive system can be made as closed unit and with gears made strong and solid, and in which the electric power supply and transmission system is directly connected to the mechanical power transmission system, preferably so that the mechanical and electric power supply and transmission systems are made as an integral unit.

According to the invention the mechanical power transmission means comprises a drive shaft which at both ends is connected to angle gears at the crank housing and at the drive hub, and in which the drive shaft is housed in one of the bottom fork tubes of the bicycle frame and in which the electric power supply and transmission system is directly connected to the mechanical power transmission system at the drive wheel hub.

The power transmission includes crank- and pedal means which includes an angle gear which engages the shaft which in turn engages an angle gear at the rear wheel hub. In a preferred embodiment of the invention a gear box is mounted inside the crank housing for the crank-and-pedal means whereby the gear box is separated from the driving and braking parts of the driving wheel. Thereby, both the driving wheel hub with the driving and braking parts thereof and the gear box may be formed in the best possible way as long lasting units. By separating the gear box from the driving and braking means the drive system also is more easily maintained. In a special embodiment of the invention the drive system is formed as a complete integral unit with crank housing with cranks, wheel with wheel hub and interconnecting frame tubes, which integral unit is the very core of the bicycle from which the bicycle frame, front wheel, the handle bar, etc. may be mounted.

Figure 2:
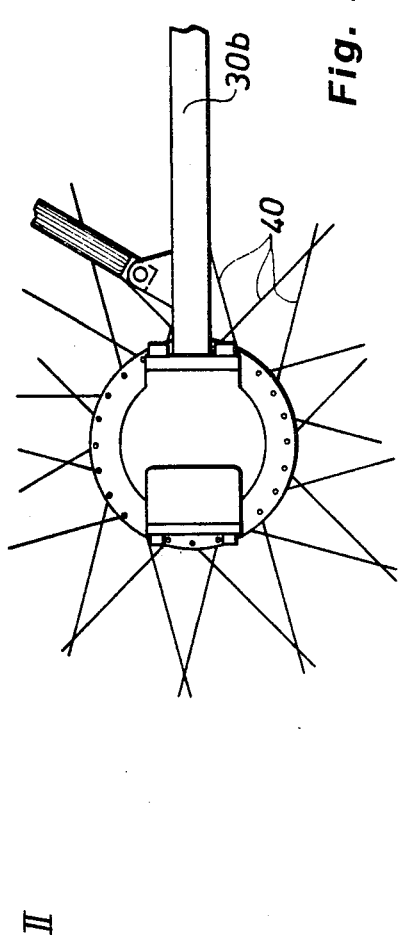
Figure 3:
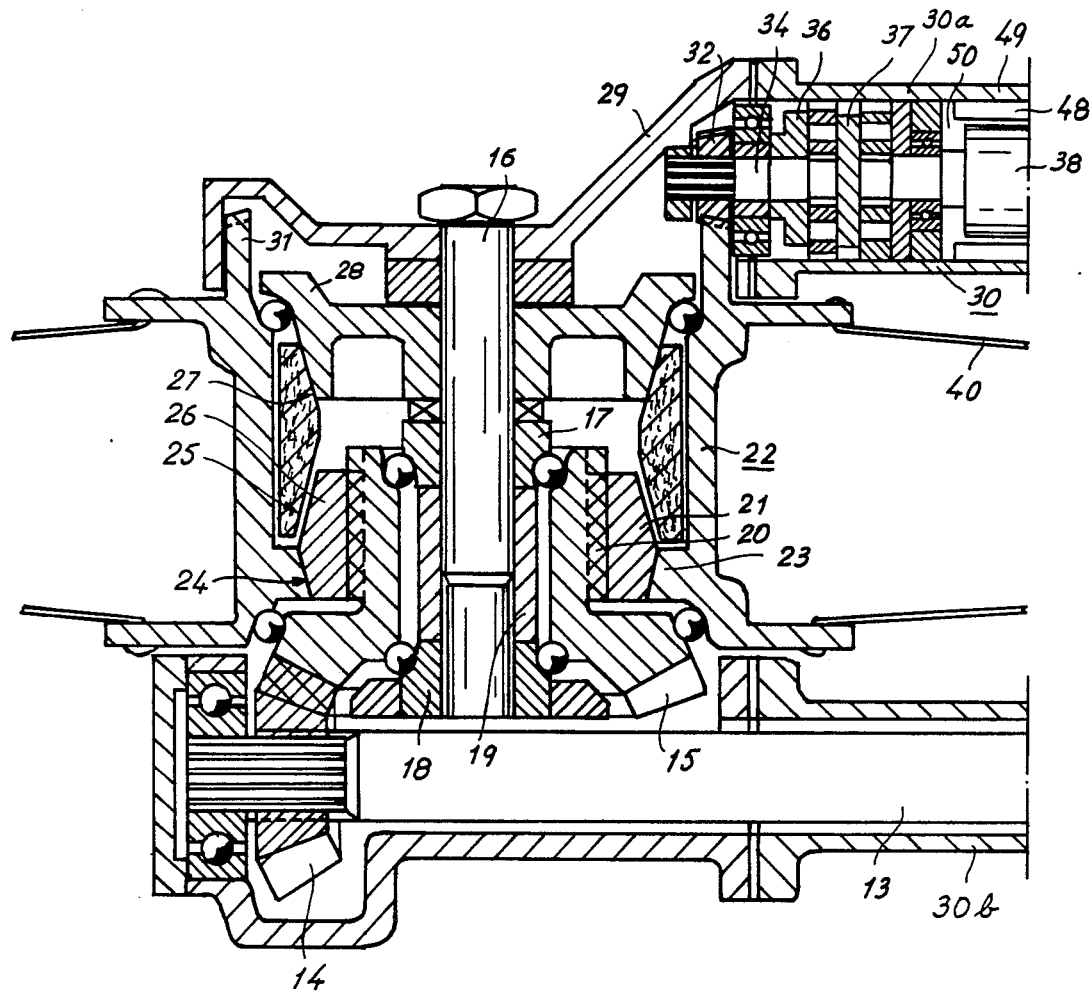
Figure 4:
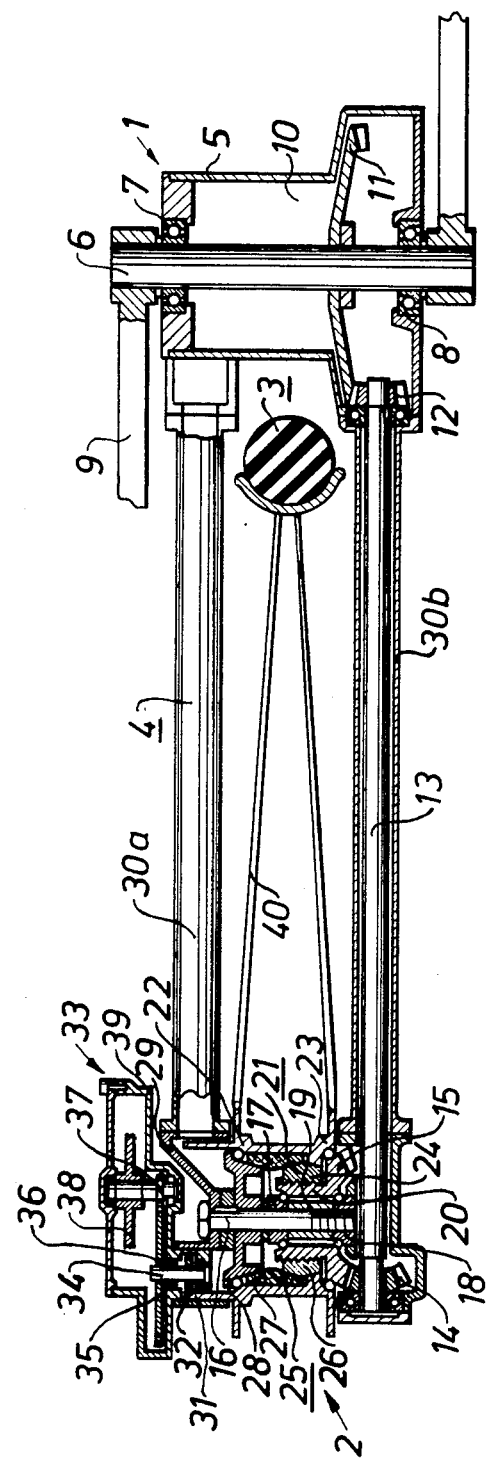
Figure 5:
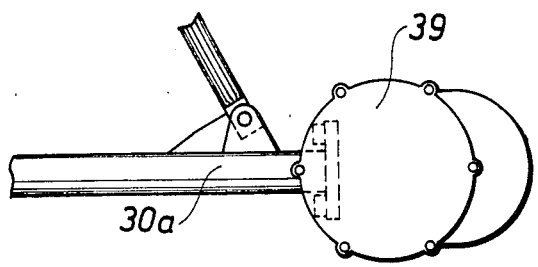
Figure 6:
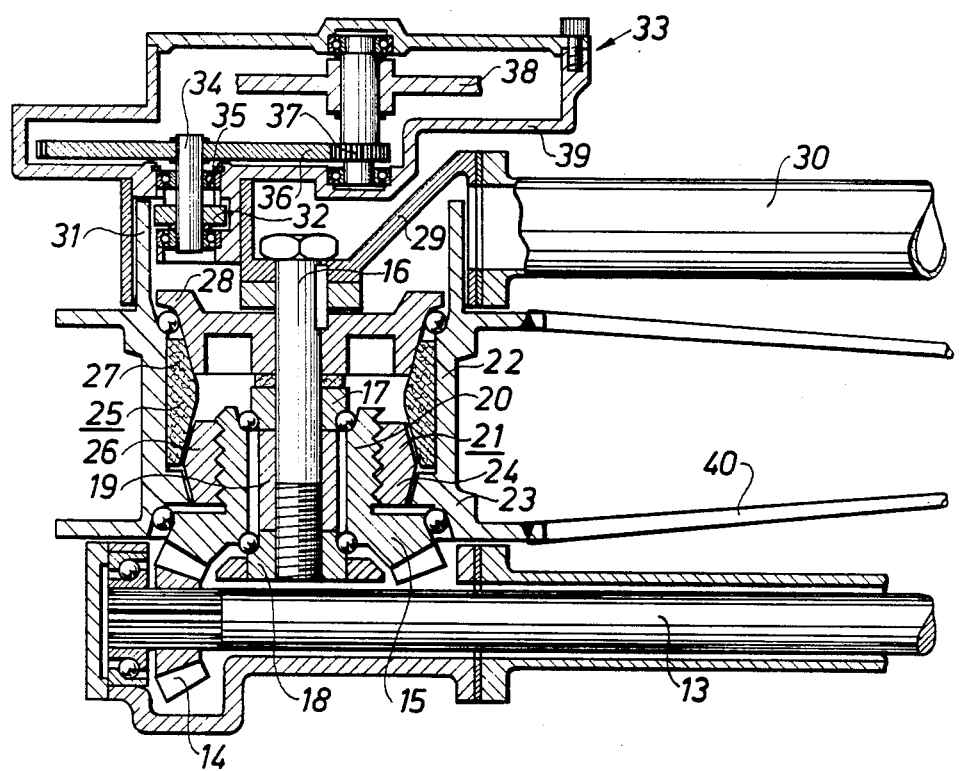

Now, the invention will be described in detail with reference, to the accompanying drawings in which FIG. 1 shows a horizontal cross section through a diagrammatically illustrated embodiment of a power transmission system for a bicycle. FIG. 2 is a diagrammatical side view seen along line II of FIG. 1. FIG. 3 is a partial cross section view of the embodiment of FIG. 1 in a larger scale. FIG. 4 is a horizontal cross section view of an alternative embodiment of the invention. FIG. 5 is a side view of the embodiment of FIG. 4 following the arrow V, and FIG. 6 is a partial cross section view of the embodiment of FIG. 4 in a larger scale.

The power transmission unit shown in FIGS. 1-3 generally comprises a crank housing 1 having a crank-and-pedal means, a drive wheel hub 2 having a drive wheel 3 connected thereto and between the crank housing 1 and the drive wheel hub 2 and interconnecting the frame tube 4. The crank housing means comprises a crank housing 5 in which a crank shaft 6 is inborne ball bearings 7 and 8. At the ends of the crank shaft 6 bicycle crank-and-pedal means 9 are mounted as is conventional. In the interior of the crank housing there is a space 10 which is intended for mounting of a non-illustrated gear box, for instance a gear box having ten gears. The crank shaft 6 or the output shaft of the gear box is connected to a crank shaft gear 11 which engages a first gear 12 which is mounted at one end of drive shaft 13. The opposite end of the shaft is connected to the drive wheel hub and transmits the driving power to a power receiving gear 15 of the drive wheel hub over a second drive 14 mounted at the end of the shaft 13. The power receiving gear 15 is borne on a central shaft 16 of the drive wheel hub by means of two ball bearings 17 and 18 with bearing cones and with a spacer sleeve 19 provided in said bearing cones. The power receiving gear 15 is formed with a cylindrical threaded portion 20 on which an inner threaded drive sleeve 21 is releasably mounted. The object of the drive sleeve 21 is both to provide transmission of the driving power from the power receiving gear 15 to the hub sleeve 22 of the drive wheel hub 2 and to make a braking possible. To provide a forward drive, the hub sleeve 22 is formed with a cone portion 23 against which a conically formed first portion 24 of the drive sleeve 21 is urged when forcing the pedals in a forward direction, whereby the drive sleeve 21, which by a slight friction engages the cone portion 23 is forced outwards on the threaded drive portion 20 as shown in the drawings. Thereby the drive sleeve engages the hub cone portion 23.

For providing braking, there is a conical break band 25 to which a second conically formed portion 26 of the drive sleeve 21 is pressed when moving the pedals in the rearward direction, whereby the drive sleeve 21 by the thread connection is moved inwards, viz. in the direction upwards as shown in the drawings to press the drive sleeve 21 to the brake band 25. As usual the brake band 25 is split so that it can be expanded and pressed to the walls of the hub sleeve. The brake band 25 is double coned like the drive sleeve 21, and when braking the cone portion 27 of the brake band 25 is pressed against a brake cone 28, which in any suitable way is non-rotatably mounted in the hub, for instance by means of a cross key.

By means of a hub shield 29 the upper (as shown in the drawings) or the left end of the hub is screw connected to a frame tube 30 which with the opposite end thereof is connected to the crank housing means 1.

The drive wheel hub preferably is directed connected to an electric generator, and for this purpose the hub sleeve 22 may be formed with an axially projecting sleeve portion 31, from which a drive wheel 32 of an electric generator 33 may receive driving power. The drive wheel 32 is mounted on a shaft 34, which in turn may be borne in ball bearings. For providing an increase of rotating speed a series of cog wheel gears or planetary gears 36, 37 are provided for transmitting the rotation power to a rotor 38 which is mounted on the same axis as the last gear 37 of the series of gears.

In the illustrated case, the rotor 38 and the stator 48 of the electric generator is mounted in the left hand frame tube 49 of the lower drive wheel fork. Between the series of bears 36, 37 which in the illustrated case are planetary gears, and the rotor 38 there is a space 50 intended for mounting of a centrifugal connection means which at a predetermined minimum rotation of the input shaft 34 starts the drive of the rotor 38.

In the frame tube 49 there is also preferably mounted a rectifier 51, for instance a diode bridge coupling from which the rectified current is supplied to an accumulator 52 which temporarily accumulates the electric power supplied by the generator 33. The outputs 53 of the accumulator 52 are connected to the front beam and the rear light of the bicycle.

The centrifugal coupling 50 may be formed so that the accumulator 52 is continuously charged as soon as the speed of the input shaft 34 of the generator exceeds a predetermined value, or the centrifugal coupling may be formed with a secondary connection means by which the centrifugal coupling and the rotor are connected only upon demand by the bicycle rider.

The embodiment of the invention shown in FIGS. 4-6 is identical to the above described embodiment except for the design of the electric generator. In FIGS. 4-6 the electric generator is preferably mounted in a generator housing 39 which may be rotatably connected to the drive wheel hub and formed so that the drive wheel 32 moves excentrically when the generator husing 39 is rotated, whereby the drive wheel 32 in one position is released from the hub sleeve portion 31, whereas the drive wheel 32 in the opposite end position is connected to the hub sleeve portion 31 thereby providing the generation of current. Electrically the generator may be designed in the conventional way which need not be described in detail.

As diagrammatically illustrated in the drawings the drive wheel hub has spokes 40 connected to the drive wheel 3.

In a suitable embodiment of the invention the lower wheel stays or bottom forks are formed with two parallelly extending frame tubes 30a and 30b respectively at the crank housing means 1 and the drive wheel hub 2 provide a solid box structure to which the other frame tubes and other parts of the bicycle can be connected in any suitable way. In both illustrated embodiments the shaft 13 is borne in one of the frame tubes 30b by means of ball bearings.

It is to be understood that the above specification and the embodiments of the invention shown in the drawings are only of exemplifying character and that many different variations may be presented within the scope of the appended claims.

I claim:

1. A mechanical and electric power supply and transmission system for a bicycle of the type having a frame connected to a crank housing (1) for a crank-and-pedal means (9) and from said crank housing a projecting bottom fork (30) carrying the drive wheel (3) over a drive hub (2) at the outer end thereof and having mechanical power transmission means between said crank housing (1) and said drive hub (2) comprising a drive shaft (30), which is enclosed in one bottom fork tube (30b), and which at both ends is connected to angle geras (11, 12, and 14, 15) respectively at the crank housing (1) and the drive wheel (3), characterized in that:

the crank housing means (1) with the drive wheel hub (2) and the bottom fork (30) provide a solid integral unit on which the bicycle is built up, drive wheel hub (2) is formed for free rotation having an axially movable double conical drive and brake sleeve (21) which upon pedalling in one direction is moved in one axial direction and is thereby connected to the drive wheel hub (2) providing a drive connection, and which upon pedalling in the opposite direction provides friction braking of the hub, the hub also includes a hub sleeve (22) having a conical portion engageable by said sleeve (21) to drive the hub and drive wheel (3), and the hub further includes a stationary brake cone (28) and an axially movable brake band (25) having oppositely oriented conical portions respectively engageable with said sleeve (21) and said brake cone (28), and the electric power supply means comprises an electric generator (33) which is connected to and driven by the drive wheel hub.

2. A transmission system according to claim 1 further characterized in that the electric generator (33) is mounted inside the second bottom fork tube (30a).

3. A transmission system according to claim 2 further characterized in that the electric generator (33) is connected to an electric accumulator (52), which is likewise mounted in said second one (30a) of the bottom fork tubes.

4. A transmission system according to claim 3 further characterized in that a rectifier is provided and connected between the electric generator (33) and the electric accumulator (52).

5. A transmission system according to claim 1 further characterized in that the electric power supply and transmission system (33) is connected to a rotatable hub sleeve (22) of the drive hub (2) over a drive wheel (32) which multiplies the rotation of the input shaft (34) of said electric transmission system, and in that at least one additional gear (36, 37) is provided for further multiplying the rotational speed of the rotor (38) of the electric generator.

6. A transmission system according to claim 5, further characterized in that the multiplying means for the rotational speed of the generator rotor (38) includes two planetary gears (36, 37) connected in series and mounted inside said second one (30a) of the bottom fork tubes.

7. A transmission system according to claim 6 further characterized in that a centrifugal coupling (50) is provided and connected between the planetary gears (36, 37) and the rotor (38) of the electric generator.

8. A transmission system according to claim 1 further characterized in that the bottom fork of the transmission is in the form of two substantially parallel tubes (30a, 30b) which sealingly enclose the electric power supply means (33) and the drive link shaft (13) respectively.

* * * * *